United States Patent
Lewton et al.

(10) Patent No.: US 10,190,660 B2
(45) Date of Patent: Jan. 29, 2019

(54) REVERSIBLE ROTATION GEARBOX AND APPLICATIONS THEREOF

(71) Applicant: Bison Gear & Engineering Corp., St. Charles, IL (US)

(72) Inventors: Robert Lewton, Schaumburg, IL (US); Tyler Brauhn, Batavia, IL (US); Aaron Hansen, St. Charles, IL (US); Jordan Kapitanoff, Aurora, IL (US); James Parejko, Aurora, IL (US)

(73) Assignee: BISON GEAR & ENGINEERING CORP., St. Charles, IL (US)

( * ) Notice: Subject to any disclaimer, the term of this patent is extended or adjusted under 35 U.S.C. 154(b) by 503 days.

(21) Appl. No.: 14/820,852

(22) Filed: Aug. 7, 2015

(65) Prior Publication Data
US 2015/0345595 A1    Dec. 3, 2015

Related U.S. Application Data

(62) Division of application No. 13/484,109, filed on May 30, 2012.

(51) Int. Cl.
*F16H 37/06* (2006.01)
*F16H 3/00* (2006.01)
*F16H 37/08* (2006.01)

(52) U.S. Cl.
CPC ......... *F16H 3/005* (2013.01); *F16H 37/0833* (2013.01); *F16H 2200/2035* (2013.01)

(58) Field of Classification Search
CPC ...................................... F16H 3/005
See application file for complete search history.

(56) References Cited

U.S. PATENT DOCUMENTS

2010/0016121 A1\*   1/2010   Jung .................. B62M 6/65
                                                                   477/111

\* cited by examiner

*Primary Examiner* — Robert W Hodge
*Assistant Examiner* — Ryan P Dodd
(74) *Attorney, Agent, or Firm* — Garlick & Markison; Kelly H. Hale

(57) ABSTRACT

A gearbox includes a planetary gear assembly, a first gear assembly, and a second gear assembly. The first gear assembly is engaged to provide a first rotational input to the planetary gear assembly when an input shaft is rotating in a first direction and is disengaged when the input shaft is rotating in a second direction. The second gear assembly provides a second rotational input to the planetary gear assembly when the input shaft is rotating in the first direction and provides a third rotational input to the planetary gear assembly when the input shaft is rotating in the second direction.

16 Claims, 6 Drawing Sheets

REVERSIBLE ROTATION GEARBOX AND APPLICATIONS THEREOF

CROSS REFERENCE TO RELATED APPLICATION

The present U.S. Utility Patent Application claims priority pursuant to 35 U.S.C. § 121 as a divisional of U.S. Utility application Ser. No. 13/484,109, entitled "REVERSIBLE ROTATION GEARBOX AND APPLICATIONS THEREOF," filed May 30, 2012, which is hereby incorporated by reference in its entirety and made part of the present U.S. Utility Patent Application for all purposes.

BACKGROUND OF THE INVENTION

Technical Field of the Invention

This invention relates to motors and more particularly to a reversible rotation gearbox for use with a motor.

Description of Related Art

As is known, there are various types of electric motors and an almost endless variety of uses for them. For instances, an electric motor may be an AC motor (e.g., synchronous or induction), a servomotor, a DC motor, or an electrostatic motor (e.g., magnetic motor). Regardless of the type, size, shape, and power level of an electric motor may vary greater; it generally includes a stator and a rotor. The stator, or rotor, generates a magnetic field, which causes motion of the other, which causes an output shaft to rotate. Note that a gearbox may be used to generate a higher or lower rotation output speed than that of the motor's output shaft.

As is further known, an electric motor may be used in applications that range from micro-mechanical systems (MEMS), to food processing equipment, to household appliances, to power tools, to automobiles, to toys, to large manufacturing equipment, etc. In many applications, an electric motor is required to reverse its direction of rotation (e.g., rotate clockwise and counterclockwise). For an AC motor, its inputs are changed (e.g., lines switched, different capacitor connection, etc.) to change the direction of the output shaft rotation. While this allows the direction of rotation to change, it does not allow the speed of rotation to change. If a change in speed is needed, a transmission is generally required.

In a DC motor, a DC controller controls the voltage level and polarity of a DC voltage provided to the DC motor. This allows the DC motor to produce a higher rotational speed in one direction than in the other direction, which is beneficial for garage door openers that allow the garage door to open faster than it closes.

BRIEF DESCRIPTION OF THE SEVERAL VIEWS OF THE DRAWING(S)

DETAILED DESCRIPTION OF THE INVENTION

Figure 1:
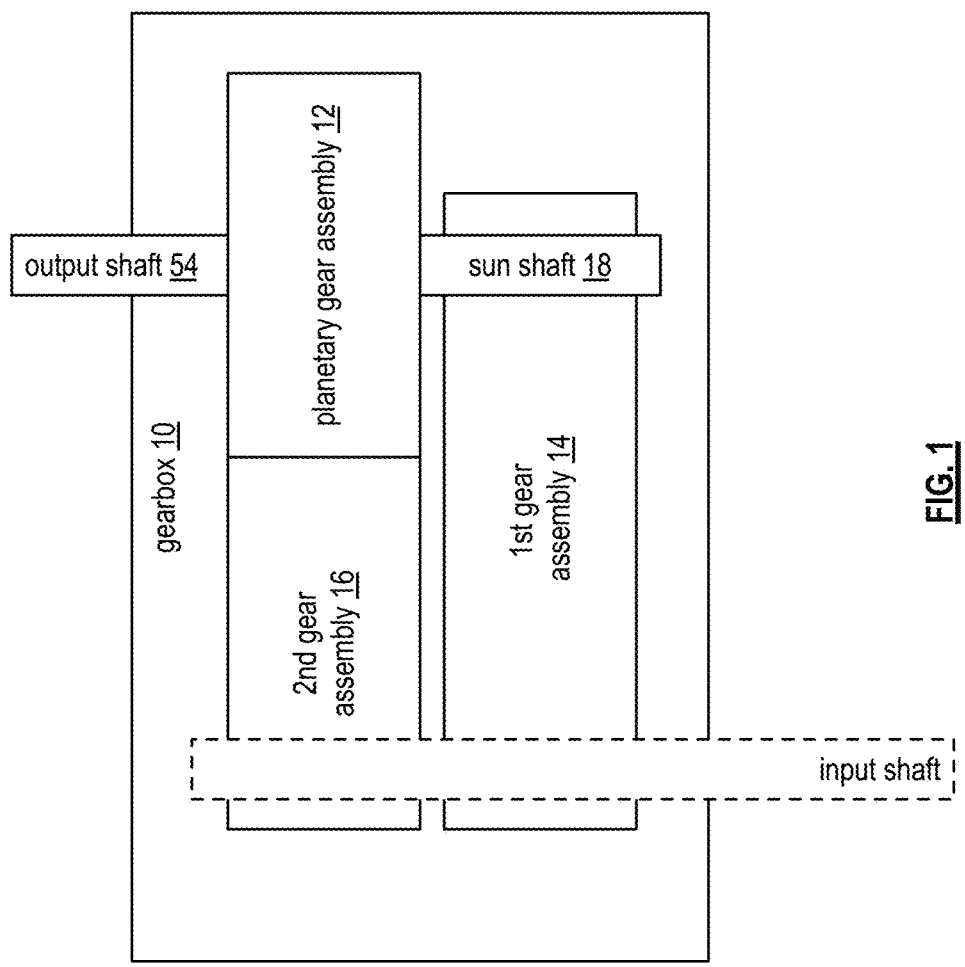
FIG. 1 is a block diagram of an embodiment of a gearbox in accordance with the present invention.

FIG. 1 is a block diagram of an embodiment of a gearbox 10 that includes a planetary gear assembly 12 (e.g., simple or compound), a first gear assembly 14, and a second gear assembly 16. The first and second gear assemblies 14 and 16 are coupled to an input shaft (e.g., a shaft of a motor) and the first gear assembly 14 is coupled to a sun shaft 18 of the planetary gear assembly 12, which includes, or is coupled to, an output shaft 54.

In an example of operation, when the input shaft is rotating in a first direction (e.g., clockwise or counterclockwise), the first and second gear assemblies 14 and 16 are engaged, or locked. As such, the first gear assembly 14 applies a force to the sun shaft 18, causing it to rotate. The second gear assembly 16 applies a force to the planetary gear assembly 12, causing the output shaft 54 to rotate in a first output direction (e.g., clockwise or counterclockwise).

As a further example of operation, when the input shaft is rotating in a second direction (e.g., opposite to that of the first direction, the first gear assembly 14 is disengaged, thus not applying a force to the sun shaft 18, and the second gear assembly 16 is engaged. In this mode of operation, the second gear assembly 16 is providing a force to the planetary gear assembly 12, causing the output shaft 54 to rotate in an opposite direction. As will be discussed in greater detail with reference to one or more of the remaining figures, the output shaft rotates at a different speed (e.g., faster or slower) than when the input shaft is rotating in the first direction due to a planet gear carrier of the planetary gear assembly 12.

Figure 2:
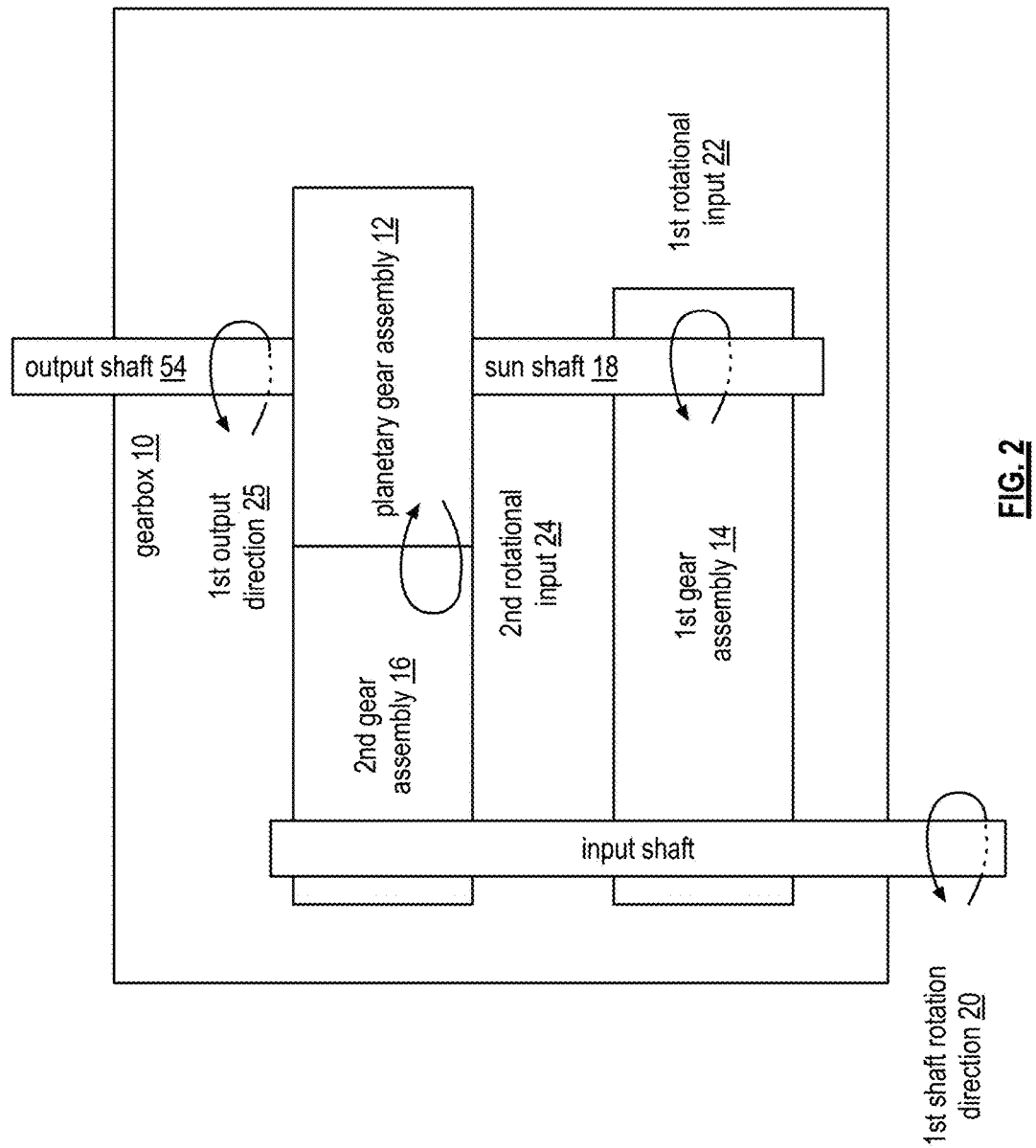
FIG. 2 is a block diagram of an example of operation of a gearbox in accordance with the present invention.

FIG. 2 is a block diagram of an example of operation of the gearbox 10 when the input shaft is rotating in the first direction 20. In this example, the first and second gear assemblies 14 and 16 are engaged. The first gear assembly 14 generates a first rotational input 22 that causes the sun shaft 18 to rotate. The second gear assembly 16 generates a second rotational input 24 that causes the planetary gear assembly 12 to rotate. The complementary rotational inputs 22 and 24 drive the planetary gear assembly 12 to produce an output shaft 54 rotation in a first output direction 25 at a first speed. Further note that the speed of the first and second rotational inputs 22 and 24 may be at the same speed as each other and as the speed of the input shaft; may be at the same speed as each other but at a different speed than that of the input shaft; may be at different speeds than each other, with one of the speeds being the same speed as that of the input shaft; or may be at different speeds than each other, with each speed being different than the speed of the input shaft.

Figure 3:
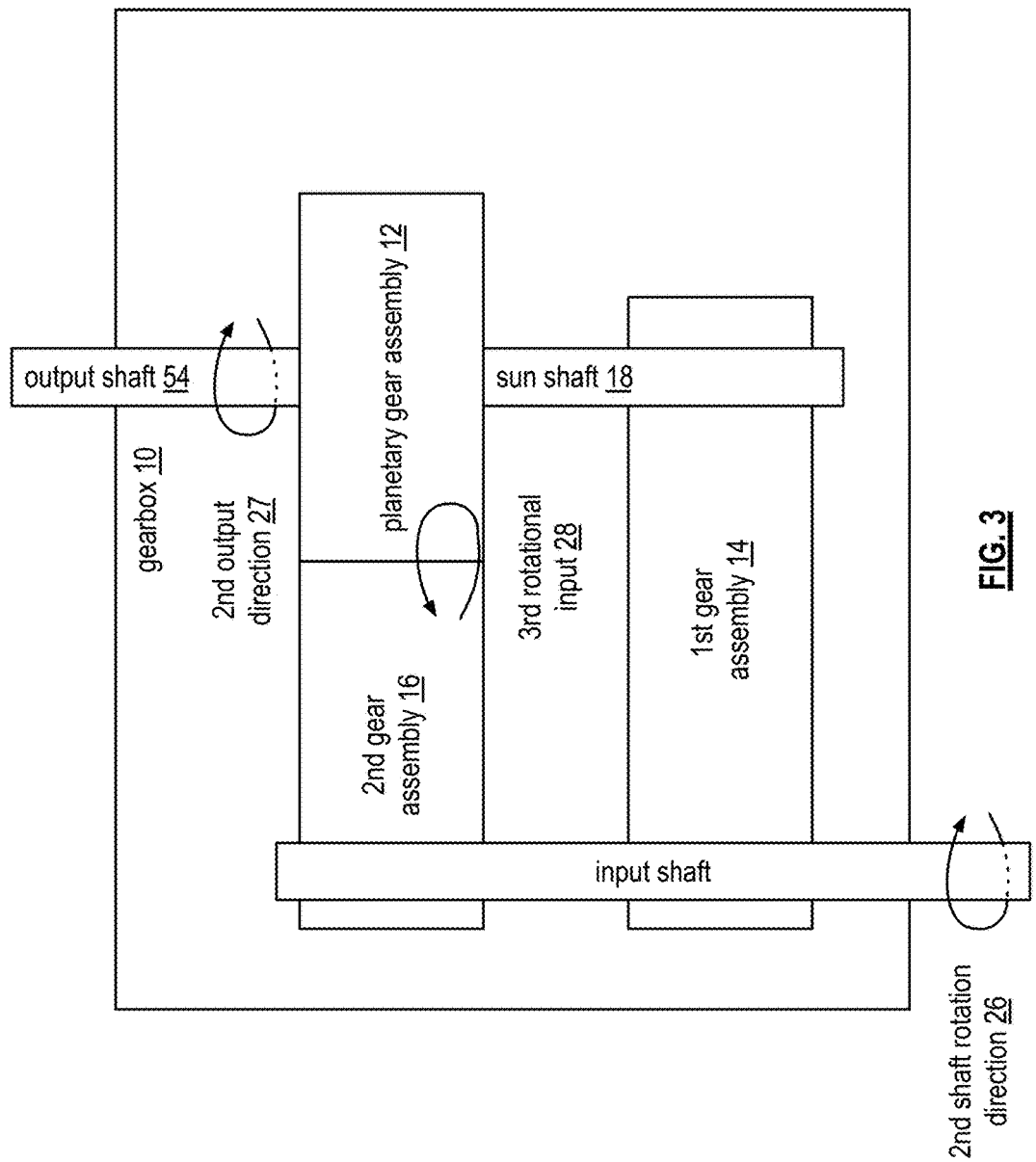
FIG. 3 is a block diagram of another example of operation of a gearbox in accordance with the present invention.

FIG. 3 is a block diagram of another example of operation of the gearbox 10 when the input shaft is rotating in a second direction 26. In this example, the first gear assembly 14 is disengaged and the second gear assembly 16 is engaged. The second gear assembly 16 generates a third rotational input 28 drives the planetary gear assembly 12 to produce an output shaft 54 rotation in a second output direction 27 at a second speed. The second output direction 27 is opposite to that of the first output direction 25 and the second output speed is different (e.g., faster or slower) than the first output speed.

Figure 4:
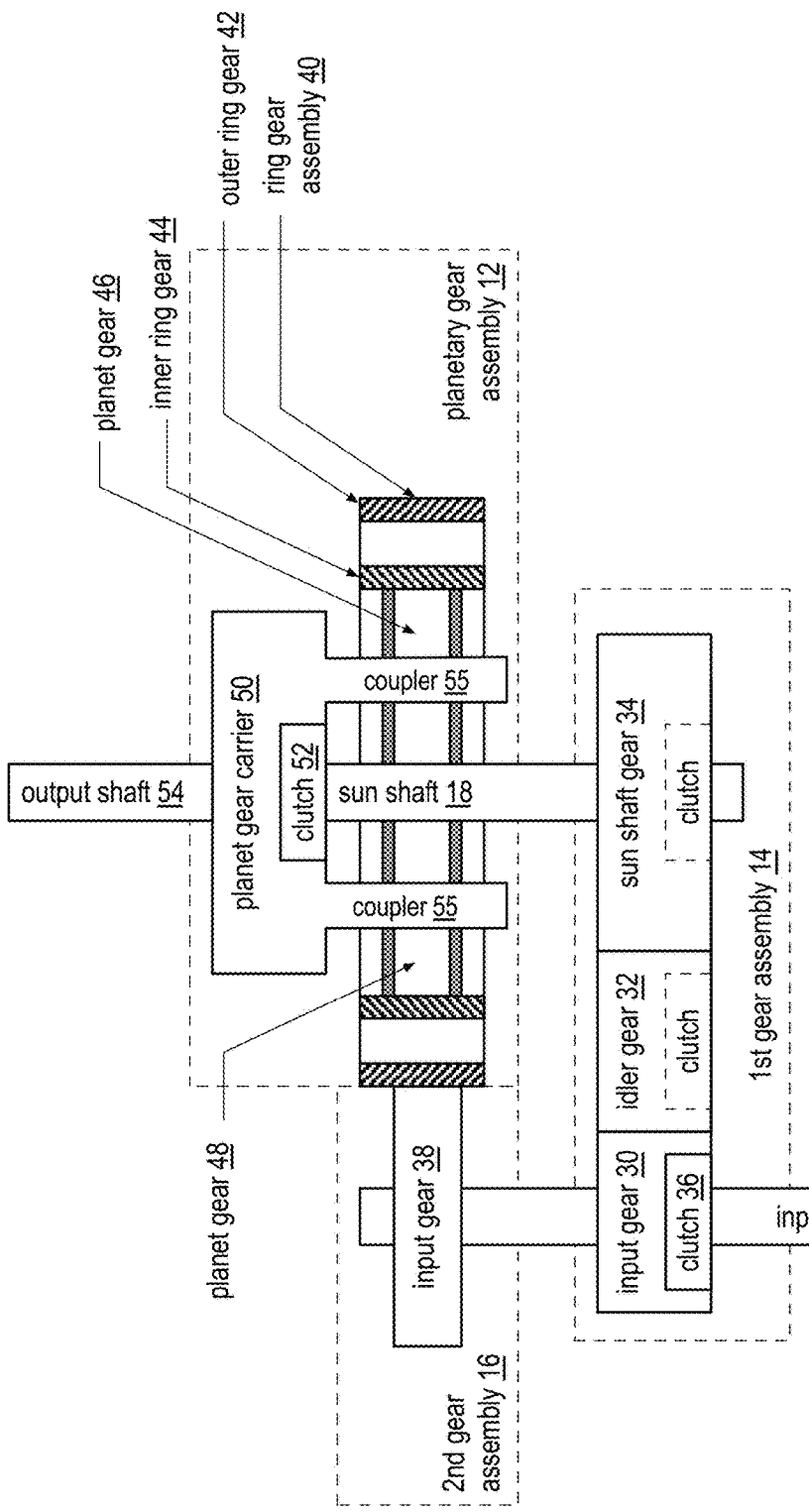
FIG. 4 is a block diagram of another embodiment of a gearbox in accordance with the present invention.

FIG. 4 is a block diagram of another embodiment of a gearbox 10 that includes a planetary gear assembly 12, a first gear assembly 14, and a second gear assembly 16. The planetary gear assembly 12 includes a plurality of planet gears 46-48 (e.g., two or more), the sun shaft 18, a ring gear assembly 40 (which includes an outer ring gear 42 and an inner ring gear 44), and a planet gear carrier 50. The first gear assembly 14 includes an input gear 30, an idler gear 32, a sun shaft gear 34, and a clutch 36 (which is shown to be part of the input gear 30, but could be part of sun shaft gear 34). The second gear assembly 16 includes an input gear 38. The planet gear carrier 50 (e.g., a planet carrier) includes a clutch 52, an output shaft 54, and planet gear couplers 55 (e.g., gears, shafts, etc.). Note that the clutch 36 may be a clutch, a ratchet, or any other mechanical device that is engaged in one direction and that is disengaged in an opposite direction.

In an example of operation, when the input shaft is rotating in the first direction at a given speed, the one-way clutch 36 of the input gear 30 is engaged, causing it to rotate in accordance with the rotation of the input shaft. The input gear 30 drives the idler gear 32, which, in turn, drives the sun shaft gear 34. The sun shaft gear 34 is mechanically coupled (e.g., welded, press fitted, screwed, bolted, glued, clamped, in physical contact via gear teeth, etc.) to the sun shaft 18 causing it to rotate in the same direction as the input shaft.

The sun shaft 18 is mechanically coupled to the planet gears 46-48, causing them to rotate in a first complementary direction (e.g., a direction based on the gearing of the first, second, and ring gear assemblies and the first rotation of the input shaft). For instance, the sun shaft 18 includes a sun gear where its teeth mechanically couple to gear teeth of the planet gears 46-48. In addition to the sun shaft driving the planet gears 46-48, the inner ring gear 44 of the ring gear assembly 40 drives the planet gears 46-48. The inner ring gear 44 rotates in accordance with the rotation of the outer ring gear 42, which is driven by the input gear 38 of the second gear assembly 16.

To insure that the inner ring gear 44 and the sun shaft 18 are applying desired rotational forces on the planet gears 46-48, the linear speed (i.e., distance traversed in a given time period) of the sun shaft 18 is different (e.g., faster or slower) than the linear speed of the inner ring gear 44. Accordingly, the gear ratio of the input gear 30, the idler gear 32, and the sun shaft gear 34 is selected to produce the desired linear speed of the sun shaft 18 and the gear ratio of the input gear 38 of the second gear assembly 16, the outer ring gear 42, and the inner ring gear 44 is selected to produce the desired linear speed of the inner ring gear 44.

With the sun shaft 18 rotating in the present direction, the clutch 52 of the planet gear carrier 50 is disengaged. In this manner, the sun shaft 18 and the input gear 38 are the inputs of the ring gear assembly 12 causing the output shaft 54 of the carrier 50 to rotate in a first output direction (e.g., clockwise or counterclockwise) at a first output speed.

In another example of operation, when the input shaft is rotating in the second direction at the given speed, the one-way clutch 36 of the input gear 30 is disengaged. The input gear 38 of the second gear assembly 16 is engaged to rotate the outer ring gear 42 of the ring gear assembly 40, which causes the planet gear carrier 50 to rotate in a complementary second direction (e.g., a direction based on the gearing of the second and ring gear assemblies and the second rotation of the input shaft). For instance, the individual planet gears do not rotate around their individual axis, but the planet gear carrier 50 rotates based on rotation of the sun shaft 18, which causes the individual planet gears to rotate.

In this example, the clutch 52 of the planet gear carrier 50 is engaged. In this manner, the outer ring gear 42 is the input of the ring gear assembly 12 causing the output shaft 54 of the carrier 50 to rotate in a second output direction (e.g., clockwise or counterclockwise) at a second output speed. Note that the second output direction is opposite to the first output direction and the second speed is different (e.g., greater than or less than) the first output speed.

In a further example, the first direction of the rotation of the input shaft is a clockwise direction and the second direction of the rotation of the input shaft is a counterclockwise direction. Accordingly, the second rotational input includes a clockwise direction rotation and the third rotational input includes a counterclockwise direction rotation.

In various embodiments of the gearbox 10, the gear assemblies 12-16 may include more or less gears than shown in FIG. 4 to achieve a desire gear ratio, a desired output power, a desired first output speed, and a desired second output speed. In addition, the size, number of teeth, and material of each gear within each assembly 12-16 may vary based on the application. For instance, if the gearbox is used in a MEMS application, the gears will be micrometers to millimeters in size and composed of silicon or other MEMS material. Alternatively, if the gearbox is used in an industrial application, the gears may be fractions of meters to tens of meters in size and composed of steel, plastic, or other industrial acceptable material.

Figure 5:
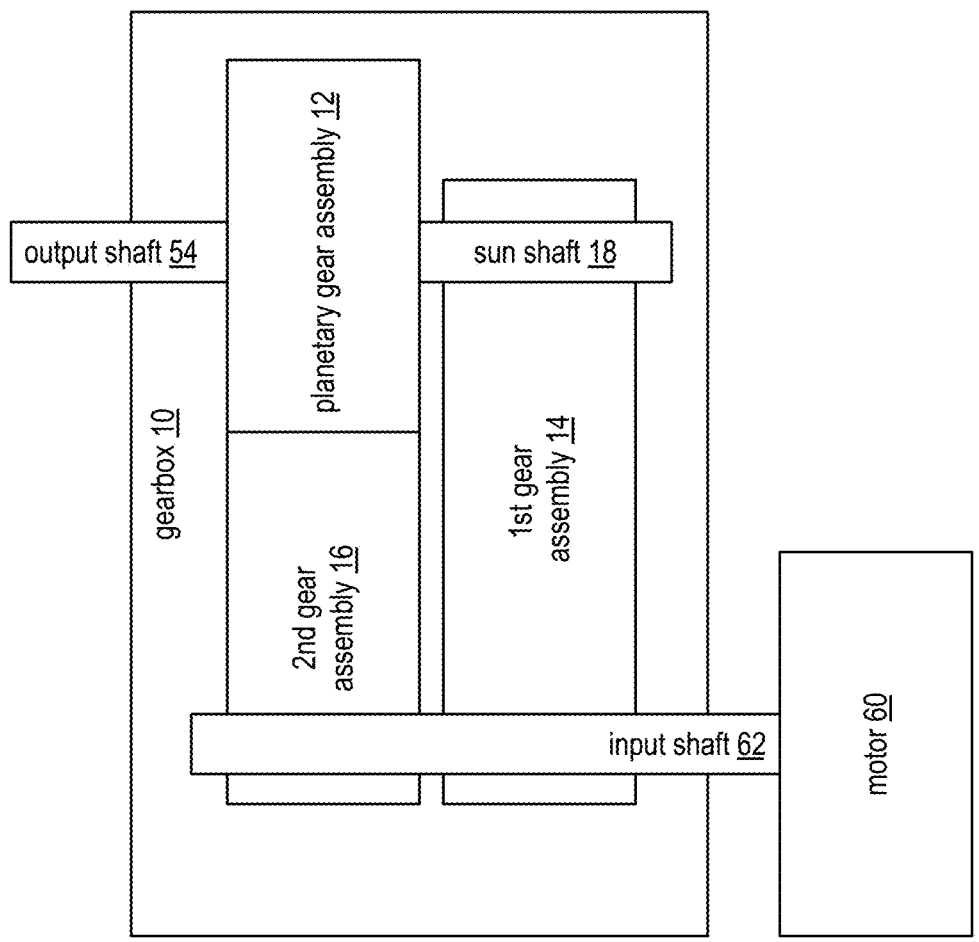
FIG. 5 is a block diagram of an embodiment of a motor-gearbox in accordance with the present invention.

FIG. 5 is a block diagram of an embodiment of a motor-gearbox that includes the gearbox 10 and a motor 60. The motor includes a shaft 62, which is the input shaft to the gearbox. The motor 60 may be a reversible AC motor such that, by changing its inputs, the rotation of the shaft 62 may change direction, but, in either direction, will be of a constant speed.

The gearbox is mechanically couplable to the motor (e.g., via the shaft 62) and includes the planetary gear assembly 12, the first gear assembly 14, and the second gear assembly 16. The first gear assembly 14 is engaged to provide a first rotational input to the planetary gear assembly 12 when the motor shaft 62 is rotating in a first direction and is disengaged when the motor shaft 62 is rotating in a second direction. The second gear assembly 16 provides a second rotational input to the planetary gear assembly 12 when the motor shaft 62 is rotating in the first direction and provides a third rotational input to the planetary gear assembly 12 when the motor shaft 62 is rotating in the second direction.

When the first gear assembly 14 is engaged, a clutch of the planet gear assembly 12 is disengaged. In this manner, the sun shaft 18 and the second gear assembly 16 are the inputs of the planetary gear assembly 12 causing the output shaft 54 to rotate in a first output direction (e.g., clockwise or counterclockwise) at a first output speed. When the first gear assembly is disengaged, the clutch of the planet gear assembly 12 is engaged. In this manner, the planetary gear assembly 12 caused the output shaft 54 to rotate in a second output direction (e.g., clockwise or counterclockwise) at a second output speed.

Figure 6:
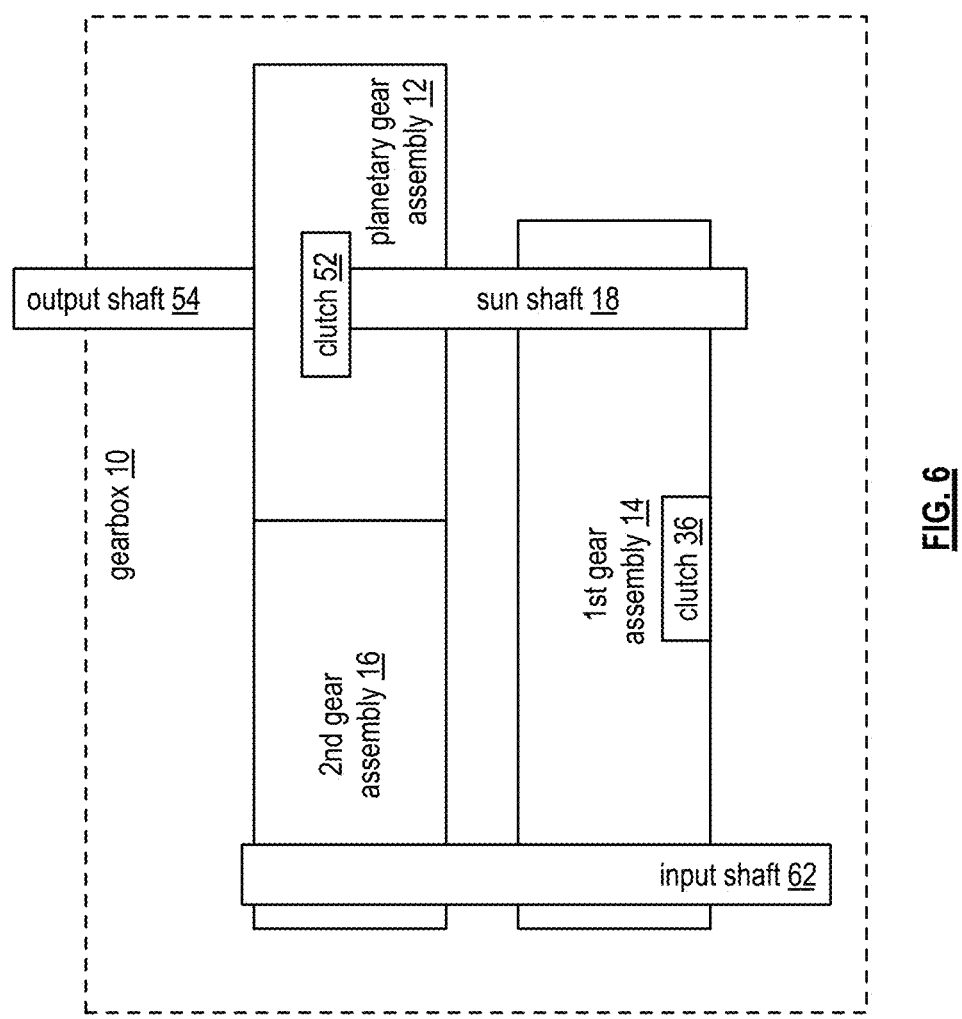
FIG. 6 is a block diagram of another embodiment of a gearbox in accordance with the present invention.

FIG. 6 is a block diagram of another embodiment of a gearbox 10 includes a planetary gear assembly 12, a first gear assembly 14, and a second gear assembly 16. The first gear assembly 14 is mechanically couplable (e.g., welded, press fitted, screwed, bolted, glued, clamped, in physical contact via gear teeth, etc.) to the planetary gear assembly 12 through sun shaft 18 and to an input shaft 62. The first gear assembly 14 includes one or more gears, wherein one of the one or more gears includes a first one-way clutch 36. The second gear assembly 16 is mechanically couplable to the planetary gear assembly 12 and to the input shaft 62 and includes one or more gears.

The planetary gear assembly 12 has an output shaft 54 and includes a one-way clutch 52, which is coupled to the sun shaft 18. When the input shaft is rotating in the first direction at a speed, the one-way clutch 36 is engaged and the one-way clutch 52 is disengaged such that the output shaft rotates in a first output direction at a first speed. When the input shaft is rotating in the second direction at the speed, the one-way clutch 36 is disengaged and the one-way clutch 52 is engaged such that the output shaft 54 rotates in a second output direction at a second speed.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A gearbox comprising:
   a first gear assembly having a first input gear selectively coupled to an input shaft and the first gear assembly also coupled to a connecting shaft, wherein the first gear assembly is configured to engage and provide a first rotational input to the connecting shaft in response to the input shaft rotating in a first direction wherein a first clutch is configured to disengage a force transmitted from the first gear assembly to a planetary gear assembly in response to the input shaft rotating in a second direction in which the second direction is rotationally opposite from the first direction;
   a second gear assembly having a second input gear coupled to the input shaft, wherein the second input gear is configured to provide a second rotational input in response to the input shaft rotating in the first direction and to provide a third rotational input in response to the input shaft rotating in the second direction, in which the second rotational input and the third rotational input are rotationally opposite; and
   the planetary gear assembly including a planet gear carrier, a plurality of planet gears and a ring gear assembly, wherein the planet gear carrier is coupled to the plurality of planet gears and to an output shaft, wherein the connecting shaft couples the first gear assembly to the plurality of planet gears and wherein the ring gear assembly couples the second input gear to the plurality of planet gears via the ring gear assembly, in which when the input shaft rotates in the first direction, the first rotational input from the first gear assembly and the second rotational input from the second gear assembly are combined to provide a first rotational output at the output shaft and when the input shaft rotates in the second direction, the first gear assembly is disengaged and the ring gear assembly is configured to provide the third rotational input in order to provide a second rotational output at the output shaft, the first and second rotational outputs being rotationally opposite.

2. The gearbox of claim 1, wherein the first gear assembly includes a first clutch to engage and disengage the first gear assembly from the input shaft.

3. The gearbox of claim 1, wherein the first gear assembly includes a first clutch to engage and disengage the first input gear from the input shaft.

4. The gearbox of claim 3, wherein the first gear assembly includes a connecting shaft gear to couple the first gear assembly to the connecting shaft.

5. The gearbox of claim 2, wherein the ring gear assembly includes a first ring gear and a second ring gear, in which the first ring gear is coupled to the second input gear and the second ring gear is coupled to the plurality of planet gears.

6. The gearbox of claim 5, wherein the planet gear carrier includes a second clutch to engage and disengage a gearing of the planet gear carrier based on a direction of rotation of the input shaft.

7. The gearbox of claim 6, wherein when the first clutch is engaged, the second clutch is disengaged and wherein when the first clutch is disengaged, the second clutch is engaged.

8. The gearbox of claim 1, wherein the output shaft has a first speed when rotating at the first rotational output and a second speed when rotating at the second rotational output.

9. A gearbox comprising:
   a first gear assembly having a first input gear coupled to an input shaft and a sun shaft gear coupled to a sun shaft, wherein the first input gear is configured to engage the input shaft, via a first clutch, and provide a first rotational input to the sun shaft, via the sun shaft gear, in response to the input shaft rotating in a first direction wherein the first clutch is configured to disengage a force transmitted from the first gear assembly to a planetary gear assembly in response to the input shaft rotating in a second direction, in which the second direction is rotationally opposite from the first direction;
   a second gear assembly having a second input gear coupled to the input shaft, wherein the second input gear is configured to provide a second rotational input in response to the input shaft rotating in the first direction and to provide a third rotational input in response to the input shaft rotating in the second direction, in which the second rotational input and the third rotational input are rotationally opposite; and
   the planetary gear assembly including a planet gear carrier, a plurality of planet gears and a ring gear assembly, wherein the planet gear carrier is coupled to the plurality of planet gears and to an output shaft, wherein the sun shaft couples the first gear assembly to the plurality of planet gears and wherein the ring gear assembly couples the second input gear to the plurality of planet gears via the ring gear assembly, in which when the input shaft rotates in the first direction, the first rotational input from the first gear assembly and the second rotational input from the second gear assembly are combined to provide a first rotational output at the output shaft and when the input shaft rotates in the second direction, the first gear assembly is disengaged and the ring gear assembly is configured to provide the third rotational input in order to provide a second rotational output at the output shaft, the first and second rotational outputs being rotationally opposite.

10. The gearbox of claim 9, wherein the first gear assembly includes an idler gear coupling the first input gear to the sun shaft gear.

11. The gearbox of claim 9, wherein the ring gear assembly includes an inner ring gear and an outer ring gear, in which the outer ring gear is coupled to the second input gear and the inner ring gear is coupled to the plurality of planet gears.

12. The gearbox of claim 11, wherein the planet gear carrier includes a second clutch to engage and disengage a gearing of the planet gear carrier based on a direction of rotation of the input shaft.

13. The gearbox of claim 12, wherein when the first clutch is engaged, the second clutch is disengaged and wherein when the first clutch is disengaged, the second clutch is engaged.

14. The gearbox of claim 13, wherein the output shaft has a first speed when rotating at the first rotational output and a second speed when rotating at the second rotational output.

15. The gearbox of claim 11, wherein the planet gear carrier includes at least one coupler to couple the planet gear carrier to the plurality of planet gears.

16. The gearbox of claim 11, wherein the output shaft is part of the planetary gear assembly.

* * * * *